Dec. 21, 1937. H. B. WHITE 2,103,050
DUSTING TOOL FOR SUCTION CLEANERS
Filed Feb. 26, 1936  2 Sheets-Sheet 2

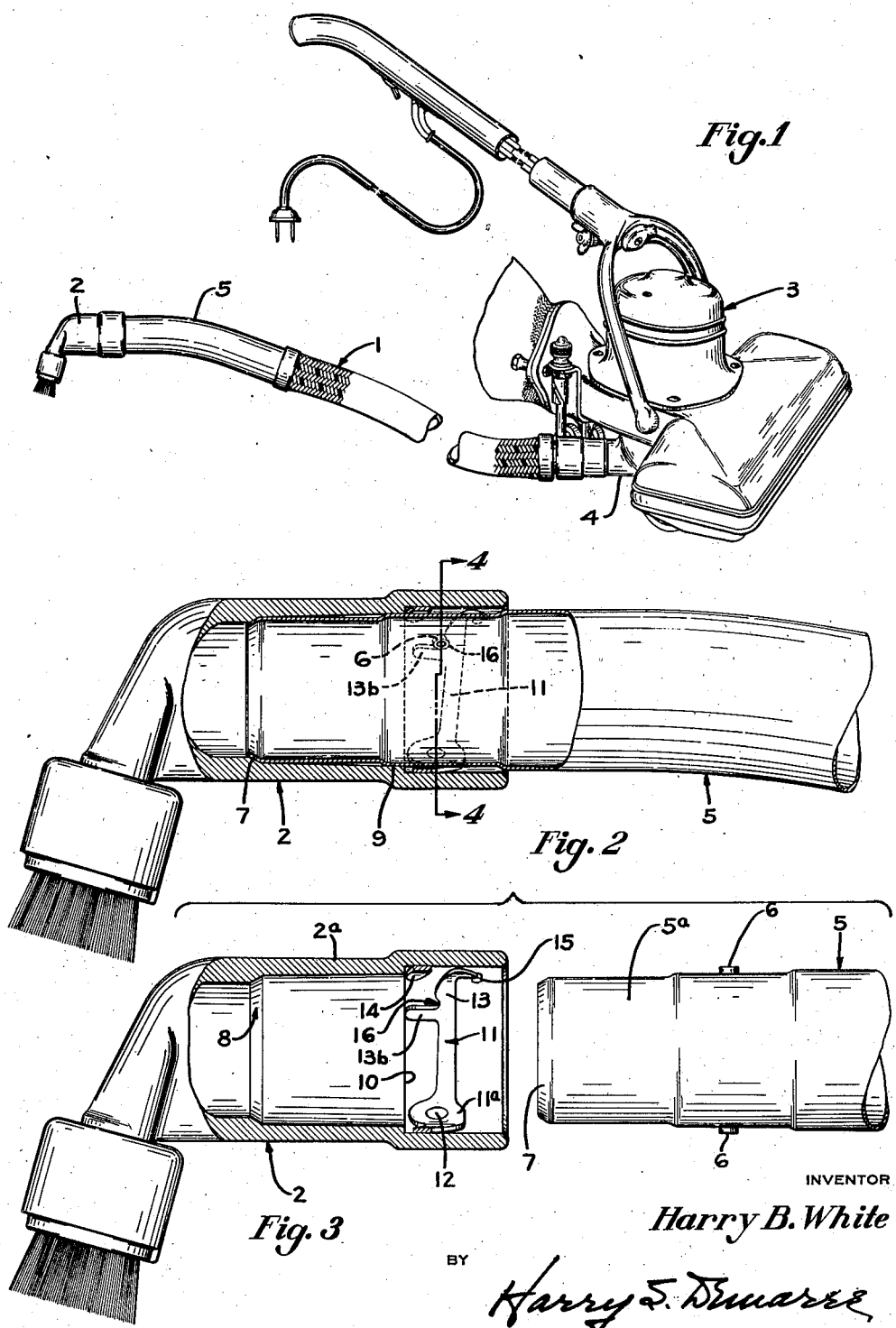

INVENTOR
Harry B. White
BY
Harry S. Demarse
ATTORNEY

Patented Dec. 21, 1937

2,103,050

UNITED STATES PATENT OFFICE 2,103,050

DUSTING TOOL FOR SUCTION CLEANERS

Harry B. White, Canton, Ohio, assignor to The Hoover Company, North Canton, Ohio, a corporation of Ohio Application February 26, 1936, Serial No. 65,768

8 Claims. (Cl. 285—175)

This invention relates to improvements in dusting tool equipment for suction cleaners and more particularly to an improved connection or joint to be used wherever two parts or sections of a dusting tool set are joined together for detachable connection.

It is well known in the art, most portable types of suction cleaners are equipped with a hose or flexible tubular extension, together with an assortment of cleaning tools suitable for draperies, upholstered furniture and surfaces other than floor coverings which may require suction cleaning. Provision is made for connecting one end of the extension hose to the cleaner, while the various tools and accessories are interchangeably attachable at the other end. Manifestly, the simplest joint and one that has been extensively used heretofore, is this plain friction type consisting of two interfitting tubular sections or sleeves. But in the suction cleaning art, at least, this style has been replaced by more positive types such as the familiar bayonet joint or the spring latch type of joint characterized by a finger pressed release button.

It is the purpose of the present invention to provide an improved type of joint, calculated to be superior to those heretofore employed and particularly desirable for connecting the various parts constituting a set of dusting tools for a suction cleaner.

In devising a practical joint or connection for a set of dusting tools, it is important that the two connecting portions be not only locked together so that they cannot be pulled apart accidentally, but also, that the joint be air-tight and thus sealed against leakage and consequent loss of suction. Thus, one characteristic of the type of joint herein disclosed is the provision of a metal-to-metal air-tight seal between the two interfitting end portions in addition to a positive locking or connecting member best described as a modification or variation of the familiar bayonet joint but which, by virtue of its novel construction and method of assembly, has a certain degree of resiliency whereby the interfitting parts once connected are held tightly together under tension.

With the foregoing introduction, the present invention will now be described in connection with the accompanying drawings in which:

Figure 1 is a general view in perspective of a suction cleaner with hose and dusting tool attached.

Figure 2 is an enlarged detailed view in partial section of a joint between the hose and a dusting tool.

Figure 3 is a view similar to Figure 2, but with the parts disconnected.

Figure 4:
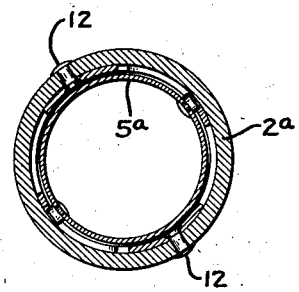
Figure 4 is a view in cross-section taken on line 4—4 on Figure 2.

As clearly illustrated in Figure 1, a typical application of dusting tools to a suction cleaner includes a hose or flexible conduit 1, carrying a dusting tool 2 at its outer end and having detachable connection at its inner end with the cleaner casing 3 through the medium of an intermediate so-called converter member 4. The outer end of the hose 1 preferably terminates in a tubular metal section or extension 5, having a somewhat tapered end portion 5a which has interfitting connection with the complementary socket-like portion 2a of the dusting tool 2 when the parts are joined together. More accurately, the end of the hose extension 5 acquires its tapered contour by two sections of reduced diameter and marked by more or less abrupt shoulders, as clearly shown in Figure 3. Near the base of the tapered end portion 5a of the hose extension 5 is a pair of diametrically opposed lugs 6, 6 in the form of short pins projecting, say, $\frac{1}{16}$th of an inch from the surface. And lastly, the edge at the outer end of the hose extension 5 is bent inwardly at an angle of approximately 30 degrees, thus providing a bevelled sealing lip 7.

Figure 5:
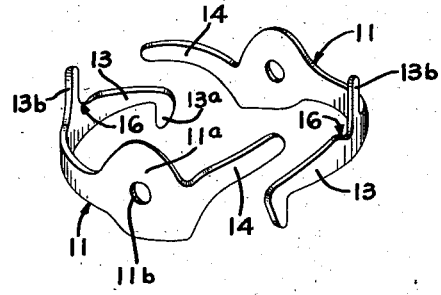
Figure 5 is a perspective view of a pair of the connecting spring members in their relative positions when assembled.

The socket portion 2a of the dusting tool 2 is manifestly the counterpart of the tapered end portion of the hose extension 5, the two interfitting with a fairly snug but not a tight fit. In fact, as clearly shown in Figure 2, actual contact between the two interfitting portions occurs only at the inner end of the hose receiving socket, where the bevelled end 7 of the latter has sealing contact with a complementary bevelled shoulder 8 marking the bottom of the socket and at a point 9 midway between the shoulder 8 and the outer end of the socket, just rearwardly of the intermediate shoulder of the tapered end 5a of the hose. Inwardly from this point of annular contact at 9 the hose receiving socket converges with a slight taper to the shoulder 8, whereas outwardly from this same point, the socket is increased abruptly in diameter to form an enlarged outer end section marked by an abrupt shoulder 10 and an annular space of appreciable width between the interfitting end of the hose extension 5 and the socket when the former is inserted as clearly shown in Figure 2. This annular space outwardly from the shoulder 10 accommodates a pair of resilient connecting members 11, 11 coacting with the lugs 6, 6 to hold the parts in locking connection with each other. These connecting members 11, 11, as clearly shown in Figure 5 are symmetrically arranged internally of the enlarged outer end portion of the socket 2a and together form the halves of a resilient locking ring coacting with the pin-like projections 6—6 after the manner of the familiar bayonet joint.

Now each of the connecting members 11 has an enlarged centrally disposed body portion 11a with a hole 11b punched therein whereby each is rigidly fastened as by a rivet 12 to the inner wall of the socket portion 2a as clearly shown in Figure 4. Extending from one side of the body portion 11a of each spring member 11 and in a clockwise direction as viewed in Figure 5, is a long curve linear arm 13 extending circumferentially through an arc of approximately 90 degrees and terminating in a right angled detent 13a. And extending from the opposite side of the body portion 11a of each spring member 11 is a somewhat shorter arm 14. And finally, each connecting spring has a transverse finger 13b located midway between the ends of the longer arm 13, the end of this finger as well as the end of the shorter circumferentially extending arm 14 bearing against the shoulder 10 as clearly shown in Figure 3. As assembled, the detent 13a at the end of the arm 13 of each connecting spring member 11 projects outwardly toward the open end of the socket as clearly shown in Figure 3 and, being firmly held against turning on the rivet by the abutting contact of the arm 14 and finger 13b against the shoulder 10, the only movement possible is the resilient action of the somewhat flexible arms 13, 13 under the wedging action of the lugs 6, 6 in contact therewith as the end of the hose is inserted into the socket, as will presently be described. And in order to limit the resilient movement of the arm 11a of the locking member, stop members or lugs 15, 15 are provided on the internal surface of the socket immediately behind the detents 13a, 13a of the arm 13, 13, so as to limit the amount said arms may flex in an outwardly direction.

Now by referring to Figures 2 and 3, it will be seen that upon presenting the end of the hose extension 5 to the socket of the dusting tool as in Figure 3, and forcing the former into the latter, that the lugs 6, 6 will first encounter the springs 11, 11 and then, by rotating the two interfitting parts relative to each other, the lugs 6, 6 will presently enter the somewhat oblique passages between the arms 13a of one and the shorter arms 14 of the other connecting member 11. Entering these passages then, the lugs 6, 6 upon further rotation of the two interfitting parts exert a cam action first on the outer and then on the back edges of the detents 13a, 13a, thus forcing the said arms to yield in an outward direction as said lugs slide along their back edges toward notches 16, 16 at the base of each spacing finger 13b, as is shown in Figure 2. Now, once lodged in the notches 16, 16, the lugs 6, 6 are resiliently and yieldingly held against release, with the result that the two parts are firmly locked or joined together as long as the dusting tool is being utilized for cleaning. However, a relative twisting or rotating movement of the parts in the opposite direction releases the lugs 6, 6 from the notches 16, 16 and the dusting tool may be readily removed.

In this connection, however, it is to be observed that the resilient connecting members act on the pin 6, 6 in a direction to force the end of the hose extension firmly into the socket thus bringing the sealing lip 7 into tight sealing contact with the bevelled shoulder 8. Now, this makes it possible to eliminate entirely the use of resilient sealing rings or gaskets at this same point or elsewhere in the joint and which otherwise would be necessary if an air-tight seal is to be established. However, with pressure being continually exerted to hold the bevelled lip and shoulder in sealing contact through the action of the resilient connecting members 11, 11, it is thus possible to maintain an air-tight metal-to-metal seal between the parts and thus dispense with the more expensive construction requiring the insertion of rubber gaskets at the joints.

Figure 6:
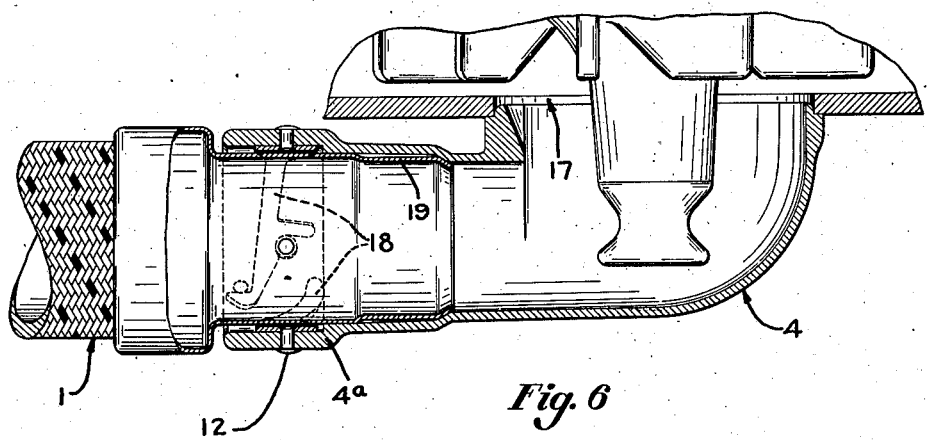
Figure 6 is a detailed view in vertical section showing the method of connecting the hose to the cleaner and Figure 7 is a view similar to Figure 6 showing the ends of the hose disconnected from the intermediate fitting.
Figure 7:
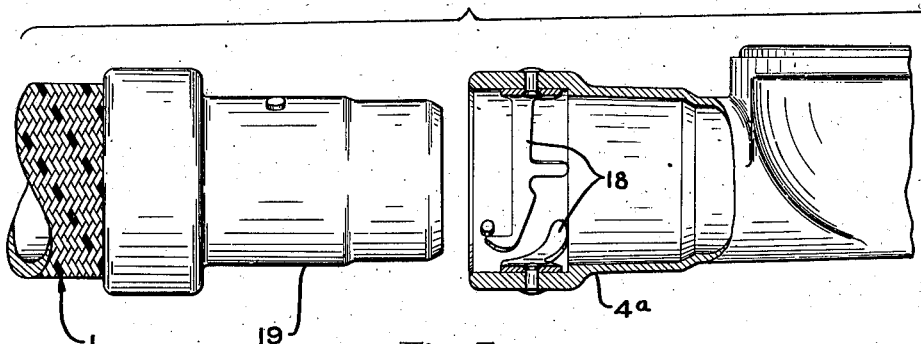

While the joint construction described is duplicated throughout the dusting tool equipment, it may be helpful to observe how this duplication is carried out at the inner or cleaner end of the hose. In operating the cleaner with the dusting tools it is first necessary to divert the suction from the cleaner nozzle to the dusting tool, this ordinarily being done by attaching the so-called converter member or fitting 4 over or around the "fan eye" or opening 17 leading from the passage from the nozzle chamber into the fan chamber as clearly shown in Figure 6. This auxiliary fitting or converter member has the general form of an elbow fitting designed to have one end inserted into the fan eye and locked with its outer end extending laterally from beneath the cleaner casing, as clearly shown in Figure 1. The outer end of the converter fitting 4 is provided with a socket 4a and connecting spring assembly 18, similar in all respects to the socket portion 2a of the dusting tools. However, there is a slight difference in the length of the fitting 19 at the inner end of the hose 1 but otherwise the design and locking action of the interfitting parts are the same.

Thus having described the novel joint construction particularly adapted for applying dusting tools to a suction cleaner, it is apparent that the same may properly be termed a resilient bayonet type, the advantages of which are at least two-fold. First, the interfitting and connecting of the hose end with any one of several interchangeable tools or accessories by inserting one within the other end and then, by turning them relatively to each other, are locked accidental disengagement or disconnection while the dusting tools are in use and, at the same time, affording a simple method of disconnecting the same, namely, by a slight rotation of the parts in the opposite direction. And secondly, by the resiliency or spring action of the connecting members the parts are not only held against disengagement but are yieldingly forced together in axial direction thereby establishing an airtight seal between contacting bevelled surfaces calculated to prevent air leakage at the joint without the necessity of introducing additional sealing means such as the rubber rings or gaskets.

Having thus disclosed a preferred embodiment of the invention, I claim:

1. The combination with a pair of tubular members adapted to have their end portions connected by fitting one within the other, of a resilient bayonet type joint therefor comprising projecting lugs disposed diametrically opposite each other on the internal of said tubular members and coacting connecting members mounted within the external of said tubular members and having resilient arms provided with marginal notches adapted to contact said lugs and yieldingly lock said tubular members together in the predetermined relative rotation thereof.

2. The combination with a pair of tubular members adapted to have their end portions joined by interfitting one within the other, of a resilient type of bayonet joint therefor, comprising a curvilinear spring mounted circumferentially within an internal recess in the external of said tubular members and having a resilient arm adapted to engage a lug on the internal of said tubular members.

3. The combination with a pair of tubular members adapted to have their end portions joined by interfitting one within the other, of a resilient type of bayonet joint therefor, comprising a pair of substantially semi-circular springs mounted within an internal recess adjacent the outer end of the external of said tubular members and having resilient arms adapted to have latching engagement with complementary lugs on the internal of said tubular members in the act of rotating the same relative to each other.

4. The combination with a pair of tubular members adapted to have their ends fitted one within the other, of a resilient type of bayonet joint comprising outwardly projecting lugs on the internal of said tubular members and latch members having arms arranged circumferentially around the entrance to the external of said tubular members to form grooves to guide said lugs into contact with marginal notches in said arms and acting to yieldingly hold said lugs in latched position.

5. The combination with a pair of tubular members adapted to be joined together by interfitting the end portion of one into a socket-like end portion of the other, said internal member having a beveled end adapted to contact a beveled seat at the inner end of the socket portion of said external member, the latter having a pair of resilient connecting members arranged circumferentially about the end thereof and including a pair of diametrically opposed marginal notches and a pair of correspondingly disposed lugs on said internal tubular member adapted to be brought into latching engagement with said notches to hold said beveled end in sealing contact with its seat.

6. The combination with a pair of tubular members adapted to be connected with their ends fitted one within the other by a bayonet type joint comprising a lug projecting radially from one and a latch member carried by the other of said tubular members, said latch member consisting of a circumferentially arranged flexible arm having a marginal notch adapted for latching engagement with said lug.

7. The combination with a pair of tubular members adapted to have their ends fitted one within the other and held by a bayonet type joint comprising radially projecting lugs on one and latch members on the other of said tubular members, said latch members including flexible arms arranged circumferentially about the entrance to said last mentioned tubular member and having marginal notches adapted to engage said lugs yieldingly.

8. The combination with a pair of tubular members adapted to have their ends fitted one within the other and to be detachably connected by a bayonet type joint comprising radially projecting lugs on the internal of said tubular members and coacting latch members consisting of flexible arms mounted adjacent the entrance to the external of said tubular members and arranged circumferentially thereof with portions spaced apart to form helical grooves to guide said lugs, said latch members having marginal notches adapted yieldingly to engage and disengage said lugs in the relative rotation of said tubular members into and out of interfitting relation.

HARRY B. WHITE.